United States Patent [19]
Pluenneke et al.

[11] 3,919,806
[45] Nov. 18, 1975

[54] METHOD AND APPARATUS FOR USING ELECTRICAL CURRENT TO DESTROY GRASSES AND WEEDS

[75] Inventors: Ricks H. Pluenneke, Greenwood; Willis G. Dykes, Vicksburg, both of Miss.

[73] Assignee: Lasco, Inc., Greenwood, Miss.

[22] Filed: Nov. 1, 1974

[21] Appl. No.: 520,230

[52] U.S. Cl. .................................................. 47/1.3
[51] Int. Cl.² ........................................ A01M 21/00
[58] Field of Search ............. 47/1.3, 1.44; 239/165; 172/691; 126/271.1–271.3

[56] References Cited
UNITED STATES PATENTS

| | | | |
|---|---|---|---|
| 546,682 | 9/1895 | Scheible | 47/1.3 |
| 2,144,890 | 1/1939 | Nakaoka | 239/165 X |
| 2,484,443 | 10/1949 | Baker | 47/1.3 |
| 2,591,597 | 4/1952 | Opp et al. | 47/1.3 |
| 2,750,712 | 6/1956 | Rainey | 47/1.3 |
| 3,183,650 | 5/1965 | Ferris | 47/1.3 X |
| 3,559,337 | 2/1971 | Marcoux et al. | 47/1.3 |

*Primary Examiner*—Robert E. Bagwill
*Attorney, Agent, or Firm*—Cushman, Darby & Cushman

[57] ABSTRACT

An electrical weed killing method and apparatus. The height differential between crops and weeds growing in crop rows is utilized by providing weed killing apparatus including a plurality of individually adjustable means for directly contacting weeds. The contacting means may be deflectable spring leaves. The individual means are adjusted so that those that will pass over the crop rows are spaced above the height of the tallest crop plant, and so that those that will pass above the area surrounding the rows are spaced just far enough above the ground so that no arcing will occur between the contacting means and the ground. Speed-responsive, good-ground connection, and other electrical interlocks are provided for safety reasons.

18 Claims, 9 Drawing Figures

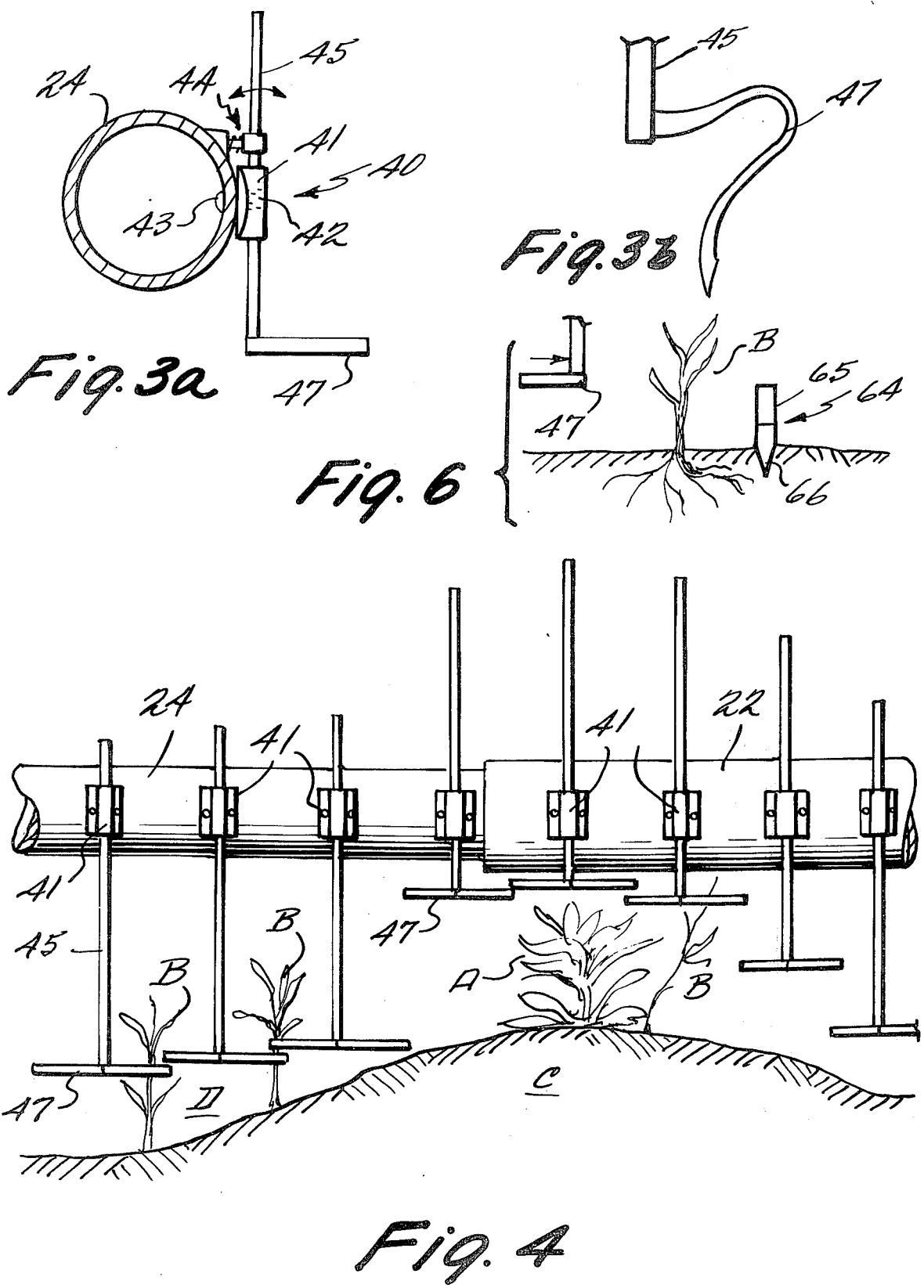

METHOD AND APPARATUS FOR USING ELECTRICAL CURRENT TO DESTROY GRASSES AND WEEDS

BACKGROUND AND SUMMARY OF THE INVENTION

The invention relates to the killing of weeds in and around crop rows without the use of chemicals and with minimum damage to the crops growing in the crop rows.

According to the present invention, the height differential between common weeds and crops at various stages of growth — especially crops like soybeans and certain low-growing vegetables in which a canopy of cockleburs or other weeds may exist above them — is utilized for destroying the weeds with electricity. Herbicides that are used to kill weeds are chemicals that are translocated from the site of application (leaves) to the roots of the weeds — electricity naturally does this by flowing to ground. Environmentally the approach according to the present invention is significant because no chemical residues will be left in the soil or on the crops, and thus their harmful effects will be avoided.

According to the present invention, the apparatus includes an electrically conductive rod connected to a source of high-voltage electricity, and means connected to the rod for transferring electricity from the rod to weeds contacted thereby. The means for transferring current from the rod to the weeds includes a plurality of individual electrically conductive members, each member being adjustable with respect to the ground. Each of the individual members may comprise a pair of conductive leaf springs which are deflected by engagement with a weed, and the combination of the plurality of elements results in a continuous front of weed destroying members along the length of the rod. The rod may include telescopic portions for allowing ready adjustment of the width of the effective area that the apparatus may traverse.

In practicing the method of the present invention, the individual weed destroying members that are to traverse a row of crops are adjusted with respect to the ground so that the lowest extent thereof is just above the height of the tallest crop plant. For the portions of the rod that will be traversing the area between the rows and thus in the furrow and around the crops, the individual members are adjusted so that they are just above the ground since no crops will be growing in these areas.

Provisions are made in the apparatus of the present invention to insure safety of all personnel working therewith, or individuals working in the vicinity thereof, and also to allow maximum manuverability of the apparatus while not destroying crops during manuvering thereof. Such provisions include: (1) vehicle speed, (2) manual operator, (3) good ground connection, and (4) high-voltage source cover interlocks that prevent delivery of electricity to the rod should adverse conditions exist.

In the past there have been many proposals for destroying plants with electricity; however, none have included utilizing the difference in weed height relative to crop height, nor the method and apparatus of the present invention and the advantages flowing therefrom. Many prior proposals have envisioned means for completely destroying all plant life within a given area since plant life in the area contemplated was undesirable at that time. Such prior devices, such as shown in U.S. Pat. Nos. 492,635, 546,682, 2,007,383, 2,429,412 and 2,591,597 are not adaptable to crop land that has crops growing therein. If such proposals were practiced and means utilized in fields in which crops were growing they would result in complete destruction of the crops as well as any undesirable plant growths. There are no means associated with such devices that would allow selective destruction of plants by taking advantage of differences in crop and weed geometry.

Other prior art proposals have attempted to destroy only undesirable plants while leaving crop plants unharmed. Examples of such proposals are U.S. Pat. Nos. 2,750,712 and 2,682,729. The first mentioned of these patents makes the assumption that the crop that will be growing will be much stronger than the undesirabe plant growths, and utilizes an electrical destroying means that is deflected out of harmful engagement with the crop plant while it will bend and operatively engage undesirable plants. In situations where the crop plant is not yet hardy enough to deflect the destroying means, the destroying means must be lifted over every crop plant that is encountered. In both cases, the area around the crop rows is destroyed by separate means such as conventional plows.

In U.S. Pat. No. 2,682,729 the same assumption is made, that is that the crop plant will deflect the electric destroying means and not be brought into engagement with a conducting portion thereof, while weeds will be bent by the means and brought into engagement with a conducting portion. Again, for the areas around the crop rows, weed destruction is by accessory means such as plows. As will thus be readily seen, each of the two above proposals requires a time-consuming operation (if movement is too fast, crop damage or reduced weed killing may ensue), and accessory means are required for weed killing in the furrows and areas around the crops. Also, such devices do not contemplate and are not readily adaptable to multiple (i.e. 12 row) row treatment, and the electrical destroying means must be formed as special cumbersome devices rather than a plurality of simple means forming a continuous front.

According to the teachings of the present invention, the above mentioned problems in the prior art are avoided, crops may bee weeded while at various stages of growth by the same device, and there is no necessity that the crops be exceptionally stiffer than the weeds. According to the present invention, weed destroying members are provided that are placed above the crops in the rows, and just above the ground in the furrows, and are deflected by and destroy all plants that they touch.

It is the primary object of this invention to provide an improved electrical weed destroying apparatus and method for use in fields with crops growing therein. This and other objects of the invention will become clear upon an inspection of the detailed description of the invention and the appended claims.

BRIEF DESCRIPTION OF THE DRAWINGS

Figure 1:
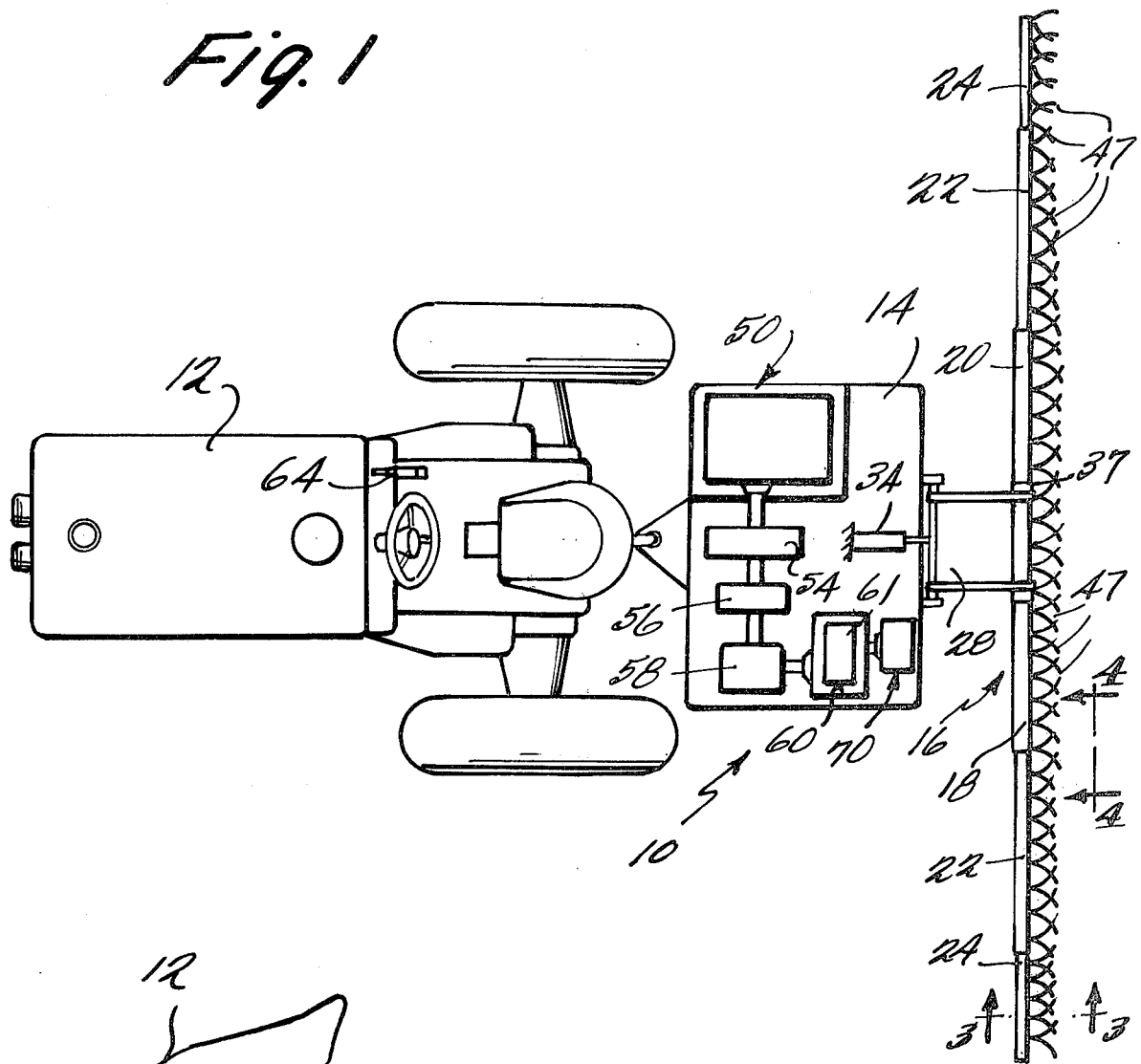
FIG. 1 is a top plan view of an exemplary weed destroying assembly according to the present invention.

FIGS. 3a and 3b are detail views of exemplary individual weed destroying members taken along lines 3—3 of FIG. 1;

Figure 5:
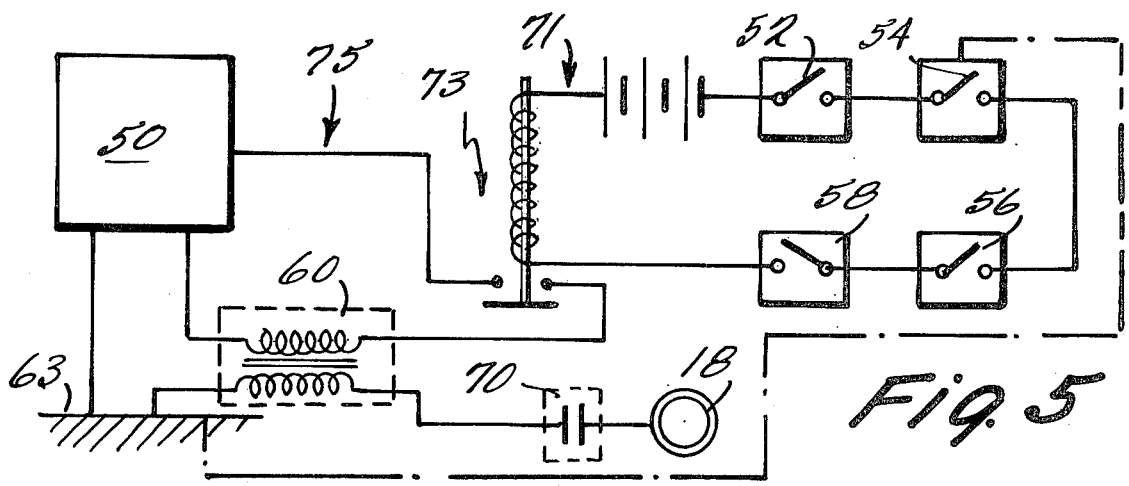
Figure 7:
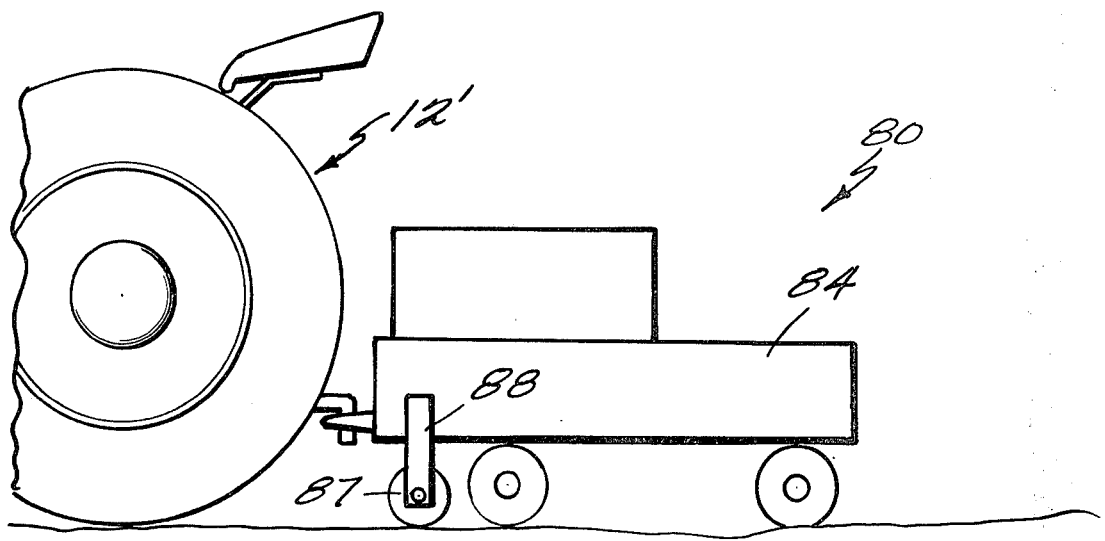
Figure 8:
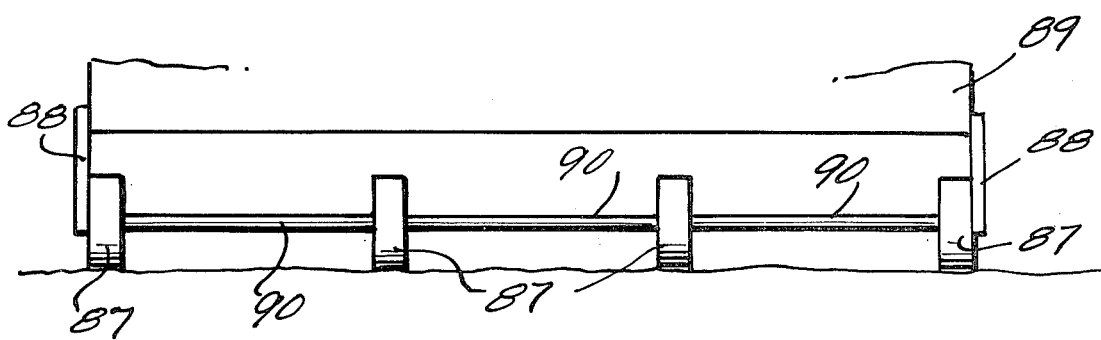

FIG. 4 is a detail view of a plurality of individual weed destroying means taken along lines 4—4 of FIG. 1;

FIG. 5 is an electrical schematic of an exemplary circuit according to the present invention;

FIG. 6 is a view partially in elevation and partially in cross-section of an electrode that may be used with the apparatus of FIG. 1 to facilitate perennial weed destruction;

FIG. 7 is a side view of a modified weed destroying apparatus for use on turf grass areas and lawns, and the like, and FIG. 8 is a front detail view of the apparatus shown in FIG. 7.

DETAILED DESCRIPTION OF THE INVENTION

It has been found that when a large enough current is passed through a plant as by touching the stem thereof with a conductor connected to a high-voltage source of electricity, the living portion of the vascular tissue passing through the stem and connecting the upper portion of the plant to the roots is disrupted and destroyed so that no products of photosynthesis can be carried from the leaves to the roots. In plants such as cocklebur and dock, the stem turns brown within several hours, and the leaves within 3 - 4 days, resulting in death to the plant. While weeds with extensive root systems — such as Johnson grass, red vine and some other perennials — are not as effectively destroyed, they are destroyed to some extent or the other, often killing all their above ground growth at the time of contact with an electric current. However, by inserting a vertical electrode (insulated above-ground, uninsulated below-ground) into the ground to a depth of 6 - 10 inches so that contact with the roots of such deep rooted plants is initiated, a greater destructive effect will be realized on such deep-rooted plants.

Exemplary apparatus for applying an electric current to the stems of plants and practicing the method of the present invention is shown generally at 10 in the drawings. The weed destroying assembly 10 consists of a vehicle for pulling the assembly, such as tractor 12, a platform for mounting the electrical generating equipment and the like, shown generally at 14, and means for transferring the current from the generating means to weeds to be destroyed, shown generally at 16.

The apparatus 16 consists of an electrically, generally conductive horizontal rod (e.g. aluminum) 18 mounted by arms 28 to the trailer 14. The rod 18 preferably is hollow and consists of several sectiona such as main section 20, middle sections 22, and end sections 24. The middle sections 22 may be designed to telescopically engage the main section 20, and the end sections 24 may be designed to telescopically engage the middle sections 22 (see FIG. 4). Relative movement between the sections may be accomplished manually or by suitable automatic means. In this way, the number of crop rows to be covered by the assembly 10 may be readily adjusted by merely sliding sections 20, 22 and 24 relative to each other. This allows the assembly 10 to cover up to 12 rows of crops while yet being compact enough for easy storage.

The means 40 transfer the weed destroying electricity from the rod 18 to the individual weeds. As shown in the drawings, the means 40 comprises a plurality of collars 41 attached at about 6 inch intervals to the rod 18 by removable fasteneres 43. The collars are made readily removable so that telescopic engagement between the sections of the rod 18 is facilitated, the collars 41 being attached to a rod section 22 or 24 when the rod section is withdrawn from rod section 20 or 22 respectively. Vertically slidable within each collar 41 is a vertically disposed bar 45. Adjustment of bar 45 with respect to collar 41 may be accomplished by any suitable means such as an interference fit therebetween — as shown in the drawings — an adjustable set screw, spring detents, etc. Attached to the bottom of each bar 45 are a pair of conductive spring leaves 47. Preferably, the spring leaves 47 are arranged so that leaves on adjacent bars 45 overlap in the transverse direction thereby insuring that at least one leaf 47 will engage any plant within the path of the rod 18. Since the leaves 47 are of relatively light construction, they are deflected by any plant that they engage, thereby wiping across the plant and insuring good electrical transfer therebetween. A suitable material for making the leaves 47 is beryllium-cooper alloy. The leaves 47 may be of any suitable shape — such as the modification shown in FIG. 3b.

A pivotal connection may be provided between each bar 45 and its corresponding collar 41 at 42 to allow pivoting of the whole bar 45 in either direction about a horizontal axis. This is done to prevent damage to the bar should it encounter any rigid obstructions. A spring 44 or the like is preferably utilized to bias the bar 45 to a normal vertical position.

The means 40 disposed according to the teachings of the method of the present invention are shown in FIG. 4. The crops A such as soybeans, in crop rows C are surrounded by weeds B in crop rows C, furrows D, and the surrounding area. The bars 45 that are to pass over the crop rows C during the movement of the assembly 10 are adjusted so that the leaves 47 thereof are located just above the top of the tallest crops A. The bars 45 that are to pass over the furrows D and the peripheries of the crop rows C are adjusted so that the leaves 47 thereof are disposed just above the ground so that weeds of all sizes will be contacted — however care must be taken that the leaves 47 are spaced far enough from the ground so that no arcing to ground occurs. During passage of the assembly through a field, then, all weeds B within the crop rows C that are taller than the crops A (the majority of the weeds for such crops as soybeans) will be destroyed by the electrical current from leaves 47, while all weeds B within the furrows D and the area surrounding the rows C will be destroyed.

Figure 2:
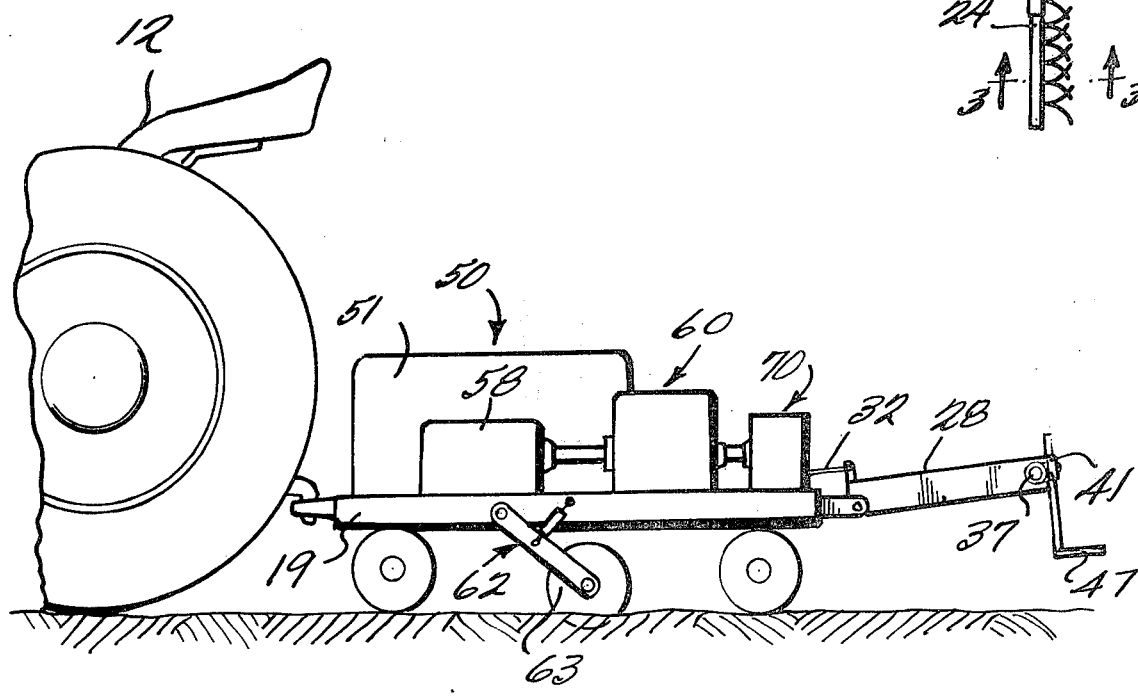
FIG. 2 is a side view of the major portion of the assembly shown in FIG. 1.

In addition to the bars 45 being vertically adjustable, the whole rod 18 is vertically movable. This may be accomplished — as shown in FIG. 2 — by pivoting the arms 28 mounting the rod 18 about the horizontal axis 30, and attaching a link 32 of hydraulic cylinder 34 to the connection 27 between arms 28. Linear movement of the link 32 by cylinder 34 will thus result in pivotal movement of the arms 28 about axis 30, and raising and lowering of the bar. It is preferred for safety reasons that the arms 28 which physically mount the rod 18 not be used to conduct current thereto, thus insulating members 37 are disposed between the arms 28 and the rod 18. Current transfer from the electrical equipment on trailer 14 to the rod 18 is accomplished by an insulated wire (not shown) running from the trailer 14 to the rod 18.

The main electrical components that are desirable to use in the weed destroying assembly of the present invention are a generator 50, a transformer 60, and a capacitor 70. The generator 50 may be driven by an onplatform engine, or preferably by a PTO drive unit provided on a prime mover (for example Onan Model 55.OUR-60 3S/161, 55 KW). An AC generator (60 Hertz) is preferred. The transformer steps up the voltage of the current from the generator; an example of the voltage obtained is about 10 KV.

The capacitor 70 may be 40 microfarads. Obviously the above examples are merely illustrative, and a wide range of values may be used.

In addition to the main electrical equipment disclosed above, it is necessary that proper grounding and other safety features be built into such an assembly because of the great potential of harm to an individual that might result from the high-voltage equipment. While electrical interlocks have been known for the protection of the driver of a vehicle towing such electrical equipment (see U.S. Pat. No. 2,007,383), interlocks for the protection of other individuals that might come into the path of the equipment or individuals riding on the trailer 14 have not heretofore been adequately provided. According to the teachings of the present invention, a series of four interlocks, each composed of a normally open condition response switch, are placed in series in the secondary circuit 71 controlling normally open coil operated switch 73 which is in series with transformer 60 in main circuit 75. The interlock 52 is responsive to the condition of the insulating cover 61 for the transformer 60, the switch 52 being closed only when the cover 61 is closed. The interlock 54 is responsive to the ground connection supplied by the wheel 63. The wheel 63 is a conductive wheel having a sharpened edge which penetrates into the ground several inches and grounds the whole electrical equipment assembly. Any suitable manual or automatic means for adjusting the relative vertical position of the wheel 63 to maintain firm ground contact may also be provided, such as lever and cylinder assembly 62. If the ground contact of the wheel 63 is not sufficient, the switch 54 will move to its normally open position.

The interlock 56 is controlled by the driver-operated manual switch 64 or the like located adjacent the driver's seat in the vehicle 12. Unless the driver is consciously holding the switch 64 in the run position, interlock switch 56 will be opened and the current to the rod cut off. The fourth interlock is provided by switch 58 which is a speed-responsive switch. Unless the vehicle 12 is travelling at a certain minimum speed, the switch 58 will open and no current may flow to the rod 18. Thus, when the vehicle 12 slows down in making turns or approaching a person in the field, the current is cut off. This is useful in preventing crop damage during turns since leaves 47 close to the ground might otherwise hit crops during turning.

As shown in FIG. 5, the normally open relay 73 may be connected in the circuit 75 between the generator 50 and the transformer 60. Interlocks 52, 54, 56 and 58 are inserted in series with the relay holding coil 73 such that each of the interlocks must be in the closed position for the relay contacts to be closed. Alternatively the interlocks 52, 54, 56 and 58 could merely be inserted in series in the main circuit 75, and the realy 73 not used.

A conductive electrode that may be provided for insertion into the ground for facilitating the passage of current down the roots of perennials such as Johnson grass, etc., is shown generally at 64 in FIG. 6 in its vertically disposed in ground position. The electrode 64 includes an insulated above-ground portion 65 that may be gripped for insertion of the electrode into the ground, and a below-ground uninsulated tip protion 66 of about 6–10 inches in length. Such electrodes may be inserted into the ground at vaious positions around the perennial weeds to be destroyed.

Operation of the assembly shown in FIGS. 1 – 5 will now be set forth. The vehicle 12 is moved into position for travelling along rows of crops in a field, with the platform 14 attached thereto. The telescoping rod sections 20, 22 and 24 are adjusted to cover the number of rows desired, the rod 18 is lowered into operative position by the arms 28, and the bars 45 are adjusted to conform to the crop rows and furrows configuration of the field. Once the bars 45 are set it will not usually be necessary to readjust them since the driver of the vehicle 12 can always align the wheels of the vehicle 12 along the same path relative to crop rows C.

Once the vehicle starts moving, interlock 58 will be closed as will ground interlock 54 (and presumably transformer cover interlock 61) — thus when the driver operates means 64 closing switch 56, current will be supplied from generator 50, transformer 60, and capacitor 70 to the rod 18, thus energizing leaves 47. Thus, any plants contacted by leaves 47 will have electrical current supplied thereto, completing the connection between rod 18 and ground, and will be destroyed. It will be apparent that the above procedure may be repeated at several stages of growth of the crops A, each time setting the leaves 47 so that they are sufficiently above the tallest crop plants A for the portions of the rod 18 that will ride over the crop rows C so that crop damage does not result.

A modification of weed killing apparatus is shown generally at 80 in FIGS. 7 and 8. The apparatus 80 is a smaller assembly than that shown in FIG. 1 – 5, and is particularly adapted for use on golf courses and for lawn farms. The trailer 84 has electrical equipment mounted thereon, and is pulled by a small tractor (12'). Current from the electrical equipment on trailer 84 is supplied to weeds by electrically conductive bar segments 90. The bar segments 90 are free-floatingly mounted on rollers 87 by any suitable means. Flanges 88 mount the end rollers 87 supporting the bar segments 90. Adjustment of the normal distance of the bar segments 90 from the ground may also be provided by any suitable means. Again, the normal height differential between grass and weeds is taken advantage of, the bar segments only touching weeds, and passing over grass.

While the invention has been herein shown and described for use in weed-killing and crop-thinning, it will also be appreciated that it may be used for defoliation of crops. It has been demonstrated that with certain plants (i. e. the legume, *sesbania exaltata* L.) by using a lesser current than is necessary for the killing of the plant, defoliation will be induced within 14 days after treatment.

It will be apparent that although the method and apparatus of the present invention have been described in what is presently conceived to be the most practical and preferred embodiments, many modifications of the method and apparatus may be made within the scope of the invention. For instance, other electrical equipment and rod raising and lowering means may be provided, or other means of grounding the assembly, or other means of adjusting the distance of the weed destroying elements from the ground, or other actual weed killing elements besides deflectable leaf members. Other mod-

What is claimed is:

1. A machine for destroying weeds growing in and around crop rows, said machine comprising
   a. a vehicle,
   b. a source of high-voltage electricity mounted on and movable with said vehicle,
   c. means for connecting said high-voltage source of electricity to ground, and
   d. means for destroying all plants higher than a predetermined height in the crop rows and all plants around the crop rows, said means including
      i. an electrically conductive generally horizontally disposed rod mounted on said vehicle and operatively connected to said source of high-voltage electricity and generally parallel to the ground, and
      ii. means mounted on said rod for transferring electricity from said rod to weeds growing in and around said crop rows traversed by said rod, said means including a plurality of individual electrically conductive members, each member comprising a pair of spring leaves or the like deflectable by weeds engaged thereby, said members being adjacent to or overlapping each other in the horizontal direction to present in combination a continuous front along the length of said rod for destroying all plants in their path, and means for individually adjusting the spacing from the ground of each of said individual electrically conductive members, said members generally not being close enough to the ground to arc thereto.

2. A machine as recited in claim 1 wherein said means for adjusting said individual electrically conductive members includes a generally vertically disposed bar mounting each of said pair of spring leaves or the likes and a means mounted on said rod for allowing adjustment of the disposition of said bar relative to said rod.

3. A machine as recited in claim 1 further comprising means for allowing adjustment of the transverse extent of said rod and said electricity transferring means attached thereto.

4. A machine as recited in claim 3 wherein said rod is tubular and said means for allowing adjustment of said rod includes a main segment of said rod, and telescopic secondary segments for telescopic movement into and out of said rod.

5. A machine as recited in claim 1 further comprising means for adjusting the spacing between said rod and the ground.

6. A machine as recited in claim 1 wherein said grounding means includes an electrically conductive sharp-edged wheel operatively connected to said vehicle and said high-voltage source and penetrating the surface of the ground.

7. A machine as recited in claim 1 further comprising means for preventing delivery of electricity from said source of high-voltage electricity to said rod unless said vehicle is travelling at or above a predetermined speed.

8. A machine as recited in claim 1 further comprising means for preventing delivery of electricity from said source of electricity to said rod should said means for grounding said high-voltage source not satisfactorily ground said source.

9. A machine as recited in claim 1 further comprising means for preventing delivery of electricity from said source of electricity to said rod should an access cover to said high-voltage source be opened.

10. A machine as recited in claim 1 further comprising a normally open operator controlled switch connected between said rod and said high-voltage source.

11. A machine as recited in claim 1 wherein said means for destroying plants taller than a predetermined height further include a conductive electrode having an above-ground insulated portion and a below-ground uninsulated portion, said electrode being adapted to be vertically disposed in the ground for facilitating passage of current into perennial weed root systems.

12. Apparatus for destroying weeds growing in and around crop rows comprising
    means for destroying all plants higher than a predetermined height in the crop rows and all plants around the crop rows, said means including
    an electrically conductive rod adapted to be mounted on a vehicle and adapted to be connected to a high-voltage source of electricity, said rod also adapted to be disposed generally parallel to the ground, and
    means mounted on said rod for transferring electricity from said rod to weeds growing in and around crop rows over which said rod passes, said means including
    a plurality of individual electrically conductive members, each member comprising a pair of spring leaves or the like deflectable by weeds engaged thereby, said members being adjacent to or overlapping each other in the horizontal direction to present in combination a continuous front along the length of said rod, and
    means for individually adjusting the spacing from the ground of each of said individual electrically conductive members, said members generally not being close enough to the ground to arc thereto.

13. A machine as recited in claim 12 wherein said means for adjusting said individual electrically conductive members includes a generally vertically disposed bar mounting each of said pair of spring leaves or the like and a means mounted on said rod for allowing adjustment of the disposition of said bar relative to said rod.

14. A machine as recited in claim 12 further comprising means for allowing adjustment of the transverse extent of said rod and said electricity transferring means attached thereto.

15. A machine as recited in claim 14 wherein said rod is tubular and said means for allowing adjustment of said rod includes a main segment of said rod, and telescopic secondary segments for telescopic movement into and out of said rod.

16. A machine as recited in claim 12 further comprising means for adjusting the spacing between said rod and the ground.

17. A method of destroying weeds growing in and around crop rows without destruction of crops growing therein, said method comprising the steps of
    a. providing electrically conductive weed killing apparatus including an electrically conductive generally horizontally disposed rod operatively connected to a source of high-voltage electricity and generally parallel to the ground, a plurality of individual electrically conductive members, each member comprising a pair of spring leaves or the like deflectable by weeds engaged thereby, said members being adjacent to or overlapping each other in the horizontal direction to present in combination a continuous front along the length of the rod, and means for individually adjusting the spacing from the ground of each of said individual electrically conductive members, b. positioning the individual electrically conductive spring leaves of the apparatus portions that will pass over crop rows just above the greatest height of crop that will be encountered in the crop rows, c. positioning the individual electrically conductive spring leaves of the apparatus portions that will pass over the area around but not in the crop rows just far enough above the ground so that no arcing between the apparatus and ground will occur, d. supplying high-voltage electricity to the weed killing apparatus from the source of high-voltage electricity, and e. travelling along the crop rows with said weed killing apparatus.

18. A method as recited in claim 17 comprising the further step of repeating all said method steps at various stages of growth of the crops when weeds are generally taller than said crops.

* * * * *